United States Patent [19]

Aoyagi

[11] 4,281,916
[45] Aug. 4, 1981

[54] INTERCHANGEABLE LENS ASSEMBLY FOR A CAMERA

[75] Inventor: Masao Aoyagi, Yokohama, Japan

[73] Assignee: Canon Kabushiki Kaisha, Tokyo, Japan

[21] Appl. No.: 129,430

[22] Filed: Mar. 12, 1980

[30] Foreign Application Priority Data

Mar. 15, 1979 [JP] Japan ............................. 54-33526[U]

[51] Int. Cl.³ .......................... G02B 7/02; G03B 17/00
[52] U.S. Cl. ..................................... 354/286; 350/257
[58] Field of Search ................ 354/286; 350/252, 255, 350/257

[56] References Cited

U.S. PATENT DOCUMENTS 3,906,534  9/1975  Shirasaki ............................. 354/286
4,003,068  1/1977  Hashimoto et al. ................. 354/286

FOREIGN PATENT DOCUMENTS 795168  1/1936  France ..................................... 350/257

Primary Examiner—Donald A. Griffin
Attorney, Agent, or Firm—Toren, McGeady and Stanger

[57] ABSTRACT

An interchangeable lens assembly including an adapter member which is held in a predetermined position relative to a camera when the lens assembly is mounted on the camera and a lens barrel structured to be rotatable relative to the adapter member during mounting of the lens assembly on the camera, the lens barrel having affixed thereto coupling means for coupling the lens assembly with the camera. The invention is directed particularly to the support structure of the lens barrel for rotatably supporting by means of the adapter member the signal transmission mechanism for transmitting exposure control signals between the lens assembly and the camera and an operation member for operating the diaphragm device of the lens assembly in accordance with operational parameters developed from the camera side of the lens assembly.

14 Claims, 8 Drawing Figures

INTERCHANGEABLE LENS ASSEMBLY FOR A CAMERA

The present invention relates generally to lens assemblies for a camera and more particularly to a specific type of lens assembly wherein it is not necessary to grasp a particular portion or ring member of the assembly in order to couple and decouple the assembly and the camera.

More specifically, the present invention is related to the type of lens assembly wherein an adapter member is held fixed relative to the camera while a lens barrel of the camera, which contains most of the lens operative components of the lens assembly, is rotated relative to the adapter member in order to couple or decouple the lens assembly and the camera.

The present invention is particularly directed to a lens assembly of the type described which includes a diaphragm mechanism and signal transmission devices for transmitting operative signals of the diaphragm mechanism between the lens assembly and the camera.

In interchangeable lens assemblies of the prior art, there have been developed various support means and support structures for the signal transmission member or for the operation member of the diaphragm device which depend upon the particular mounting system or mounting means utilized for mounting the lens assembly to the camera. In the case of a mounting system utilizing a screw or threaded mechanism, whereby the entire lens assembly is rotated relative to the camera while being mounted on the camera, or in the case of a bayonet mounting system, the signal transmission member for the diaphragm mechanism as well as the diaphragm mechanism operation member must also be rotated so that it becomes difficult to achieve engagement with the operative members within the camera with sufficient accuracy.

Furthermore, in interchangeable lens assemblies structured in accordance with prior art techniques which utilize screw mounting systems or bayonet mounting systems wherein the entire system must be rotated in order to couple or decouple the lens assembly and the camera, problems arise because optical accuracy cannot be insured. The present invention relates generally to a new mounting system described above which eliminates many of the difficiencies of prior art systems. The mounting system to which the present invention relates operates so that the adapter means will be held at a certain predetermined position with reference to the camera while the lens barrel is rotated relative to the adapter in order to couple or decouple the lens assembly.

In the mounting system of the aforementioned new lens assembly, the signal transmission member and the operation member for the diaphragm device, which are both mounted in the lens assembly, may be engaged with complementary members in the camera when the lens assembly is coupled with the camera in accurate alignment as a result of the fact that these members are appropriately supported by the adapter member, which is always held stationary relative to the camera during coupling and decoupling of the lens assembly.

In addition, in prior art devices, it is desirable to structure the support mechanism for the operation member and the signal transmission member with a bearing device such as a roller bearing or ball bearing device in order to enable smooth rotation with the adapter member. However, as a result there will occur other problems such as complications in the construction or assembly of the overall device and increase in the manufacturing cost thereof.

Furthermore such lens assemblies usually involve shapes and configurations which may not be capable of facilitating the utilization of more modern materials in the manufacturing techniques thereof. For example, recent lens assemblies are more and more structured from plastics instead of metal and, as a result, the shapes thereof must adapt to the more modernized forming techniques involved.

Accordingly, the present invention is directed toward improving the aforementioned new type of lens assembly, wherein the lens barrel is rotatable relative to the adapter member which is maintained fixed relative to the camera during coupling and decoupling, and more particularly to a mounting system wherein the diaphragm signal members may be more conveniently mounted in the adapter member.

A further aim of the invention is to offer a construction for an interchangeable lens assembly whose costs may be reduced, particularly by facilitating manufacture of the lens assembly from plastic materials.

The invention is further directed toward an interchangeable lens assembly whose assembly and material costs may be lowered by facilitating manufacture of the individual parts of the assembly from plastic materials thereby enabling molding techniques to be utilized which will shorten the manufacturing and assembly time.

A further aim of the invention is to provide an interchangeable lens assembly which may be joined together without the utilization of securing means such as screws by making use of the elasticity of the material, whereby the members constituting the adapter means of the assembly will be formed from plastic materials.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
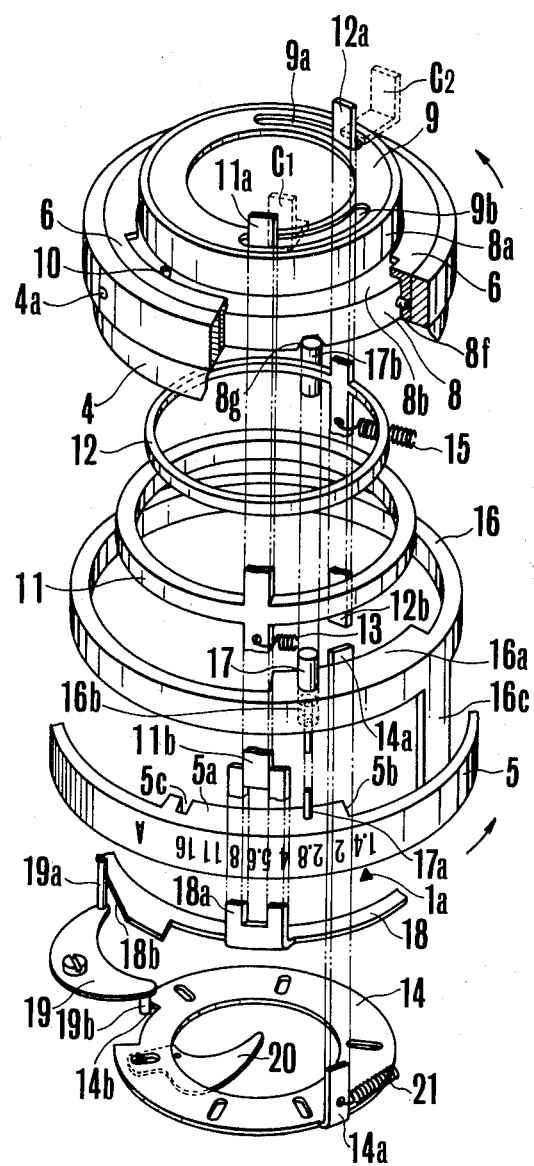
FIG. 1 is an exploded perspective view showing the principal parts of a lens assembly in accordance with the present invention.

With reference to the drawings, wherein similar reference numerals are used to refer to like parts, the interchangeable lens assembly of the present invention is shown as basically comprising an annular main support tube or lens barrel 1 having a distance adjusting threaded part on the internal surface thereof at one of its ends. A positioning index 1a is provided for the aperture value scale on the aperture value setting ring, which will be explained in more detail hereinafter. A distance adjusting or focusing ring 2 is joined together with an intermediate helicoid ring 2' as one part, with the ring 2' being engaged with the threaded portion of the lens barrel 1.

A lens holding member 3 is engaged with the internal threaded helicoid of the intermediate helicoid ring 2' in order to support at least a part of the lens optics of the assembly. A bayonet mount holding ring 4 is affixed at the rear end of the lens barrel 1 and an index 4a is provided on the external circumference thereof for indicating a standard position for mounting.

An aperture value setting ring is engaged in an annular groove formed between the lens barrel 1 and the holding ring 4 so as to be rotatably supported. The aperture value setting ring 5 is provided with an aperture value scale (f-stop numbers 1.4–16) to enable manual setting of the aperture value for the lens assembly and camera. Furthermore, an index mark A is provided for enabling the lens assembly to be set for automatic operation of the aperture value.

A bayonet member 6 is affixed to the rear end of the bayonet holding ring 4. The bayonet member 6 is designed so as to enable locking engagement thereof with a complementary bayonet member located on the camera with which the lens assembly is to be coupled. The bayonet member 6 is partially formed with slit grooves (not shown) or with spring members (not shown) which may be engaged with the bayonet ring on the camera.

An adapter member 8 is engaged in an annular groove formed between the rear end of the bayonet member 4 and a shoulder 6a of the internal surface of the bayonet ring 6. The rear portion of the adapter member 8 is cylindrically shaped and is formed with a standard engaging diameter 8a for engagement with a complementary member within the camera. The rear side or end of the adapter member 8 is formed by a rear member 9 which is designed to define an optical axial opening. The rear member 9 forming part of the overall adapter means of the lens assembly is provided with arcuate slots 9a, 9b through which arms 11a and 12a of the transmission and operation members extend from the lens to the camera.

A positioning pin 10 is provided at an annular engagement surface 8b of the adapter member 8 with the pin 10 operating to enable desired mounting of the lens assembly on the camera. When the lens assembly is to be mounted on the camera, the pin 10 becomes engaged in a groove (not shown) formed in the bayonet member on the camera in order to hold the adapter means of the lens assembly rotatively fixed relative to the camera during coupling and decoupling of the lens assembly and the camera.

Figure 3:
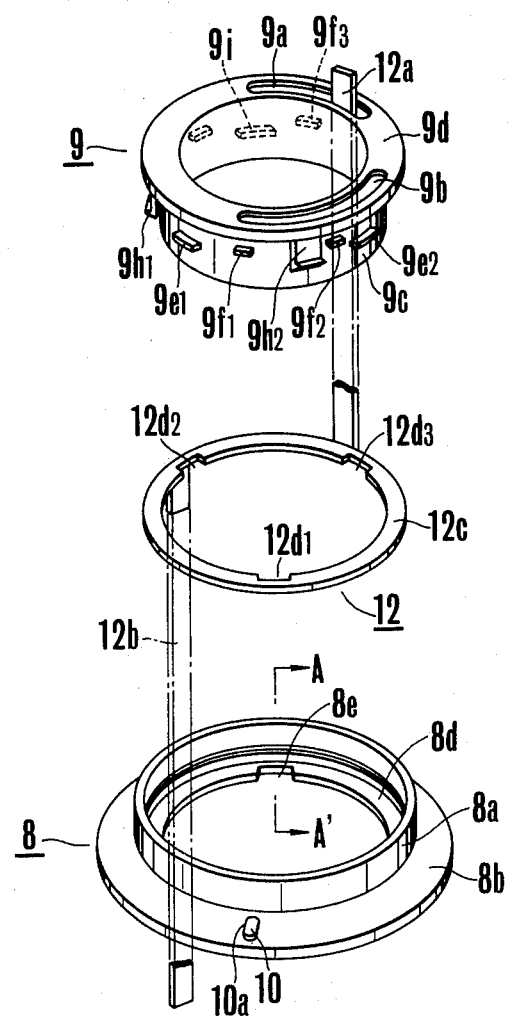
FIG. 3 is an exploded perspective view showing in greater detail individual parts of the assembly of the invention.
Figure 4:
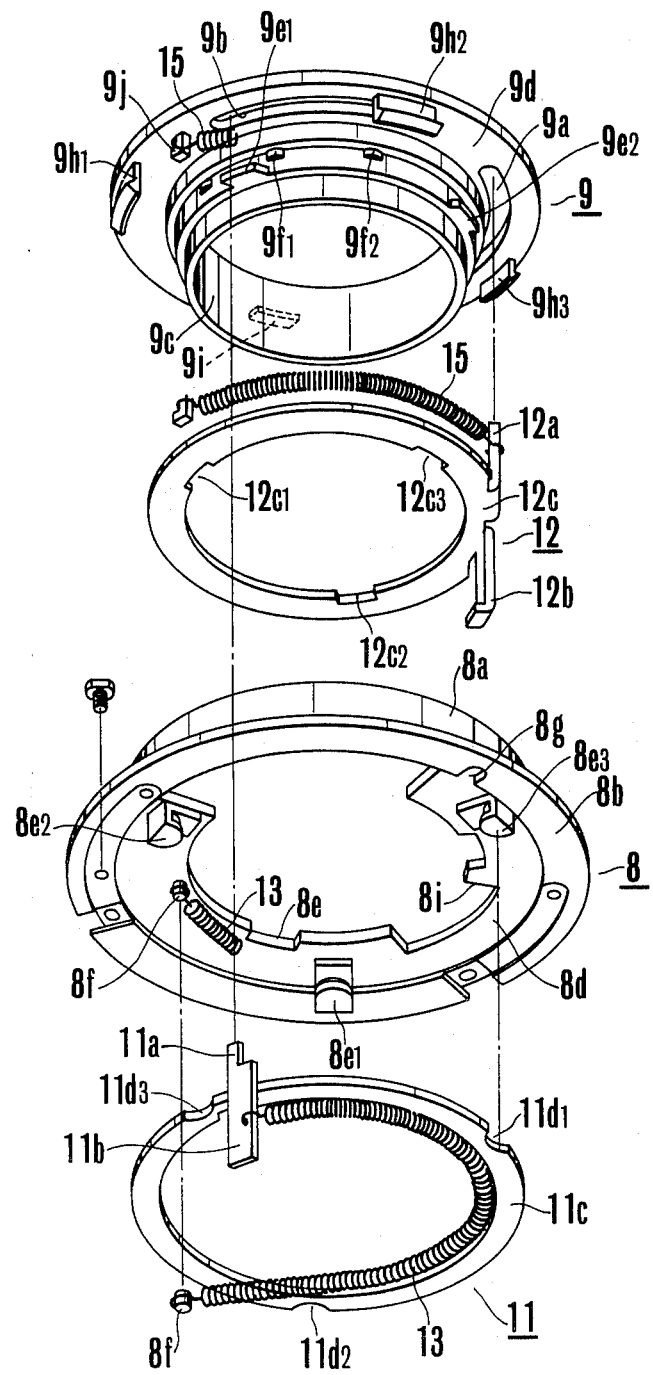
FIG. 4 is a perspective exploded view showing principal parts of the assembly of the invention.

As may be best seen in FIGS. 3 and 4, the rear member 9 of the adapter means basically consists of a cylindrical part 9c and a flange 9d, with the flange 9d being provided with the arcuate slots 9a and 9b through which the arms 12a and 11a of the signal transmission member 11 and of the operation member 12 respectively penetrate. The cylindrical part 9c is provided with two types of projections. These projections are designated $9e_1$, $9e_2$, ... $9e_x$ and $9f_1$, $9f_2$, ... $9f_x$ located at equal angular intervals on the external circumference of the cylindrical part 9c.

The base surface of the flange 9d is provided with feet $9h_1$, $9h_2$, ... $9h_x$ having ends which project radially on the back member 9. A projection 9i on the cylindrical part 9c is a positioning member which acts to affix in proper relationship the adapter member 8 and the back member 9 of the adapter means.

The operation member 12 consists of an annular part 12c and of arms 12a and 12b. The annular part 12c is provided with notches $12d_1$, $12d_2$, ... $12d_x$ located along the circumference thereof. The projections $9e_1$, $9e_2$ ... $9e_x$ of the back member 9 are arranged to be engaged within the notches $12d_1$, $12d_2$ ... $12d_x$. A spring 15 is provided between the arm 12a and a pin 9j located on the back member 9. The internal surface of the annular part 12c of the operation member 12 is in contact with the second projection $9f_1$, $9f_2$ ... $9f_x$ and the operation member 12 is urged counterclockwise by means of the spring 15. The amount of rotation of the operation member 12 and of the back member 9 is determined within the range within which the notches $12d_1$, $12d_2$ ... $12d_x$ do not correspond with the projections $9e_1$, $9e_2$ ... $9e_x$.

The number of projections $9f_1$, $9f_2$ ... $9f_x$ provided on the external circumference of the cylindrical part 9c of the back member 9 can be optionally chosen. It is recommended that the internal diameter of the cylindrical part 12c of the operation member 12 be selected to be slightly larger than the external diameter of the projections $9f_1$, $9f_2$ ... $9f_x$ of the back member 9 or in such a manner that the cylindrical part 12c may be smoothly rotated in case the part 12c is engaged over the projections $9f_1$, $9f_2$ ... $9f_x$. The internal surface of the annular part of the operation member 12 is in contact with the projections $9f_1$, $9f_2$ ... $9f_x$ so that merely point contacts or line contacts are achieved in such a manner that inferior operation of the operation member due to friction may be effectively eliminated.

The projections $9e_1$, $9e_2$ ... $9e_x$ provided on the external circumference of the cylindrical part 9c serve to prevent the operation member 12 from being moved in a direction along the optical axis and also for preventing the operation member from being separated from the back member 9.

Figure 5:
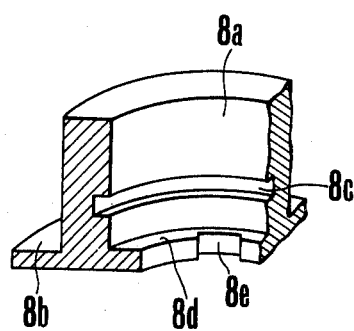
FIG. 5 is a partial perspective view showing partially in section the adapter member of the assembly.

The adapter member 8 includes a cylindrical part 8a and the flange part 8b and the cylindrical part 8a is provided with an annular groove 8c (see FIG. 5) wherein the ends of the feet $9h_1$, $9h_2$ ... $9h_x$ of the rear member 9 may be engaged. The flange member 8d extending internally of the cylindrical portion 8a is provided with a notch 8e within which the positioning projection 9i of the back member 9 is engaged. After the operation member 12 is mounted on the back member 9, the back member 9 and the adapter member 8 are positioned (9i, 8e) while the ends of the feet $9h_1$, $9h_2$ ... $9h_x$ of the back member are engaged in the ring groove 8c in the adapter member whereby the connection between the adapter member 8 and the back member 9 is established. By properly selecting the position, the shape and the material, i.e. the elasticity, of the feet $9h_1$, $9h_2$ ... $9h_x$, a superior connection between the back member 9 and the adapter member 8 may be obtained by means of pressing engagement.

The signal transmission member 11 which includes the arms 11a and 11b and the annular member 11c also includes notches $11d_1$, $11d_2 \ldots 11d_x$ provided on the annular part 11c on the external surface thereof. The signal transmission member 11 is mounted on the lower surface of the adapter member. That is, the adapter member is provided with holding members $8e_1$, $8e_2 \ldots 8e_x$ for holding the signal transmission member 11 on the lower surface of the flange member 8d by connecting the holding members $8e_1$, $8e_2 \ldots 8e_x$ to the notches $11d_1$, $11d_2 \ldots 11d_x$ of the signal member with the annular part of the signal transmission member 11 being rotatably held by means of the holding members $8e_1$, $8e_2 \ldots 8e_x$. The arm 12a of the signal transmission member 12 will extend through the arcuate slot 9a of the back member 9 in a manner to be movable therein in an arcuate path.

Between the arm 11b of the signal transmission member 11 and the pin 8f provided on the flange 8d of the adapter member, a spring 13 is provided which will urge the signal transmission member 11 in a clockwise direction. The operation member 12 and the signal transmission member 11 are held, respectively, by means of the back member 9 and the adapter member 8 in order to be rotatable. Through the aforementioned construction, the members 11 and 12 are held by means of the adapter means of the invention which consist of the back member 9 and the adapter member 8.

Figure 2:
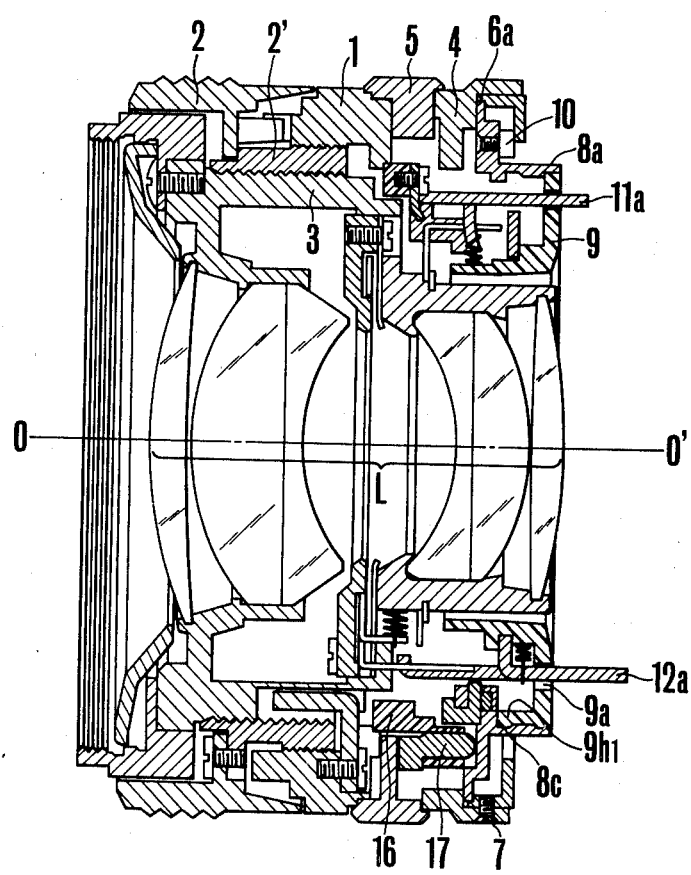
FIG. 2 is a sectional view of the lens assembly shown in FIG. 1.

As best seen in FIGS. 1 and 2, a clutch ring 16 is provided between a rear annular groove of the lens barrel 1 and the end surface of the bayonet holding ring 4 so as to be rotatable about the optical axis of the assembly. However, the clutch ring 16 is arranged so as not to be movable in the axial direction of the assembly. The clutch ring 16 provides a projection 16a extending from the internal surface thereof and provided with an aperture 16b which extends parallel to the optical axis of the assembly. A clutch pin 17 is engaged within the aperture 16b with one end 17a of the clutch pin 17 being arranged to slideably engage on an engaging part 5a formed on the aperture value setting ring 5. The opposite end 17b of the clutch pin 17 is adapted to be brought into engagement within a tapered groove 8g formed in the lower surface of the adapter member 8.

The arm 11b of the signal transmission member 11 is urged by means of the spring 13 against one end surface of the projection 16a of the clutch ring 16. As best seen in FIG. 1, when the lens assembly is dismounted from the camera, the relative positioning of the adapter means 8, 9 to the clutch ring 16 is determined by means of the clutch pin 17. Furthermore, the relative positioning of the clutch ring 16 relative to the main support tube 1 is determined so that the signal transmission member 11 will be held at a predetermined position with reference to the lens assembly. The operation member 11 is also urged by means of the spring 15 toward the end surface of the arcuate slot 9a of the back member 9 so that the operation member 12 will always be held at a predetermined position with reference to the lens assembly when the lens assembly is dismounted from the camera.

The engaging part 5a of the aperture value setting ring 5 includes a slot 5c within which the end 17a of the clutch pin 17 may become engaged when the aperture value setting ring is rotated relative to the clutch ring to align the pin 17 with the slot 5c.

The slot 5c and the groove 8g are laterally tapered in such a manner that, with rotation of the clutch ring 16 to the adapter member 8 and/or the aperture value setting ring 5, the front end 17a and the rear end 17b of the clutch pin 17 will be brought into and out of engagement with the slot 5c and the groove 8g, respectively.

A preset cam ring is rotatably held by the lens barrel 1 and a forked arm 18a extending from part of the cam ring 18 toward the rear of the lens assembly is engaged with the second arm 11b of the aperture value signal transmission member 11. The preset cam ring 18 is provided with a cam surface 18b which is engaged by a first pin 19a provided on a bell crank 19 movably supported on the lens barrel 1.

A second pin 19b extends from the bell crank 19 in a direction different from that of the pin 19a in order to engage with the diaphragm driving ring 14 through an engaging part 14b thereof.

The diaphragm means of the lens assembly includes diaphragm blades 20 and a spring member 21 provided between an arm 14a of a diaphragm driving ring 14 and the lens barrel 1 in order to urge the diaphragm driving ring 14 counterclockwise and always to urge the diaphragm blades along a predetermined direction.

The aperture value preset mechanism, consisting of the preset cam 18 and the bell crank 19, and the overall diaphragm unit itself consisting of the diaphragm driving ring 14, the diaphragm blade 20 and other similar parts related thereto, are of conventional construction and detailed explanation thereof is not provided.

Figure 6:
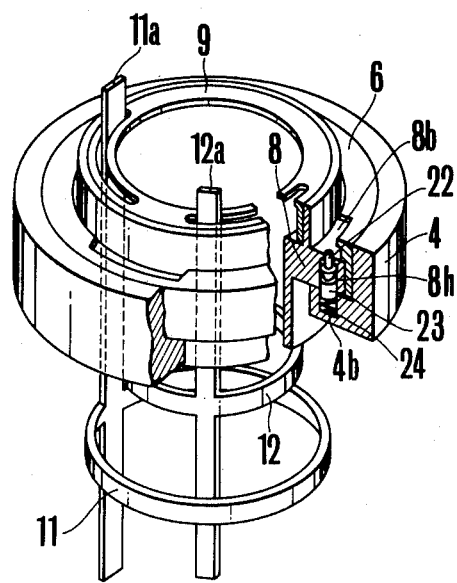
FIG. 6 is a partial perspective view showing an interlocking mechanism of the lens assembly of the type to which the invention relates.

FIG. 1 shows the lens assembly with the parts in the position in which they would be when the lens assembly is decoupled from the camera. It will be seen that, in the condition of the lens assembly where it is decoupled from the camera, the lens barrel 1 together with lens component means operatively mounted thereon will be held in a fixed predetermined relationship relative to the adapter means 8, 9 by means of a locking mechanism best seen in FIG. 6. As seen in FIG. 6 the locking mechanism consists of an operation pin 22, a lock pin 23 and a spring 24 which are operatively related in such a manner that relative rotation between the adapter means 8, 9 and the lens barrel 1 is prohibited. It should, of course, be understood that the lens barrel 1, which may be referred to as the lens barrel means of the assembly in order to include in the definition thereof lens operative components such as the distance adjusting or focusing ring 2 and the aperture value setting ring 5, is fixedly connected with the bayonet holding ring 4 and the bayonet member 6. Thus, rotation of the lens barrel means will necessarily be accompanied by rotation of the bayonet holding ring 4 and the bayonet member 6. Since the adapter means 8, 9 is rotatable relative to the lens barrel means and parts affixed thereto, release of the locking mechanism shown in FIG. 6 will enable relative rotation between the lens barrel means, the bayonet holding ring 4, and the bayonet member 6, on the one hand, and the adapter means 8, 9 on the other hand.

In the locking mechanism shown in FIG. 6, the operation pin 22, the lock pin 23 and the spring 24 are arranged within a hole 4b formed in the bayonet holding ring 4 and in a hole 8h formed in the adapter member 8, with the hole 8h and the hole 4b being in general axial alignment with each other when the adapter means 8, 9 and the bayonet holding ring 4 together with the lens barrel means are aligned in the position where the lens assembly is decoupled from the camera. The head of the operation pin 22 projects beyond the mounting plane 8b of the adapter member 8 when the lens assembly is dismounted from the camera.

When the lens assembly is brought into mounting engagement with the camera, the retainer pin 10, best seen in FIG. 1, will engage with complementary retainer means formed on the camera and will thereby lock the adapter means including the members 8 and 9, against rotation relative to the camera. At this point, the operation pin 22 will abut a part of the camera and the pin 22 and the pin 23 will be moved against the force of the spring 24 toward the hole 4b. As a result, the pin 23 will move so that its end surface will be aligned with the interface between the bayonet holding ring 4 and the adapter member 8 thereby permitting relative rotation between these members. When the holes 4b and 8h are returned to axial alignment with each other, as for example when the lens assembly is being decoupled from the camera by rotation of the lens barrel means and the bayonet holding ring 4, the spring 24 will snap the lock pin 23 to a position where it will lie intermediate the interface of the adapter member 8 and the lens holding ring 4, thereby reestablishing the rotatively locked relationship therebetween.

When mounting the lens assembly on the camera, the aperture value setting ring 5 may be set at any value between 1.4 and 16 or to the automatic setting A. In order to mount the lens on the camera, the standard engaging diameter member 8a of the adapter member 8 is brought into position so that the positioning or retainer pin 10 may be engaged with complementary retainer means on the camera which may comprise a groove provided in the bayonet member of the camera. With the pin 10 engaging within this groove, the adapter means will then be secured at a predetermined rotative position with reference to the camera.

When the bayonet claws of the bayonet member 6 and of the complementary bayonet member (not shown) on the camera, are in appropriate alignment, rotation of the lens barrel 1 and of the bayonet holding ring 4 will effect interlocking engagement between the bayonet member 6 and the complementary bayonet member on the camera. The plane 8b of the adapter member 8 will be pressed against the complementary bayonet ring on the camera and the operation pin 22 and the lock pin 23 of the lock means depicted in FIG. 6 will be pressed against the force of the spring 24 in such a manner that the adapter means 8, 9 will be disengaged from the lens barrel means, which may be considered to include the elements 1, 2, 2', 4 and 6. Thus, the lens barrel means would be made rotatable relative to the adapter means.

With the elements of the lens assembly positioned as depicted in FIGS. 1 and 6 wherein the lens assembly has not yet been mounted upon the camera, the adapter means 8, 9 and the clutch ring 16 are in the state where they are engaged with each other by means of the clutch pin 17. The arm 12a of the operation member 12 will be urged by means of the spring 15 in the clockwise direction and will be in contact with one end of the arcuate slot 9a defined in the rear wall of the member 9. The arm 11b of the aperture value signal transmission member will be urged by means of the spring 13 in the clockwise direction and will be in contact with the left end of the projection 16a of the clutch ring 16.

The relative positioning between the adapter means and the lens barrel means will be maintained by the locking mechanism depicted in FIG. 6. The relative positioning between the clutch ring 16 and the adapter means will be maintained by the engagement of the clutch pin 17 in the groove 8g. At the same time, the operation member 12a, as well as the aperture value signal transmission member 11a, will be maintained at predetermined positions as described above.

When the lens barrel 1 is rotated, together with the bayonet holding ring 4, the bayonet member 6 and the aperture value setting ring 5, relative to the adapter means 8, 9 and relative to the camera, the clutch ring 16 will at first be maintained in nonrotative relationship relative to the adapter means by the pin 17. After the aperture value setting ring 5 has been rotated through a predetermined angular distance, the right end 5b of the engaging part 5a of the aperture value setting ring 5 will be brought into contact with the arm 16c of the clutch ring 16. With engagement of the end 5b with the arm 16c, the end 17b of the clutch pin 17, which has been engaged with the groove 8g of the adapter member 8, will be moved by sliding engagement over the tapered plane of the groove 8g and the end 17b will be brought to slide along the lower surface of the adapter member 8. At the same time, the forward end 17a of the clutch pin 17 will drop into the engaging slot 5c of the ring 5. As a result, the clutch ring 16 will be disengaged from the adapter member 8 while at the same time becoming engaged for rotation together with the aperture value setting ring 5.

When the lens barrel means is further rotated, the bayonet member 6 on the lens assembly will be brought into mounted engagement with the complementary bayonet means on the camera. After a predetermined degree of relative rotation has occurred, further rotation will be prevented and the lens assembly will be engaged in operative position on the camera by engagement of the bayonet coupling means.

With the aperture value setting ring 5 connected with the clutch ring 16, the aperature value transmission arm 11a will be moved into a position corresponding to the value which is set on the aperture value setting ring 5 due to the fact that the aperture value setting member 11 will be maintained in contact with the left end of the projection part 16a of the clutch ring 16 by means of the spring 13. The arm 11a moves the operatively engaged actuation member C1 located in the camera. Consequently, when a particular aperture value shown on the aperture value setting ring 5 is aligned with the index 1a, the aperture value signal transmission member 11 will move into a position corresponding to the value on the ring 5 aligned with the index 1a through operation of the clutch ring 16. The control member C1 in the camera will be moved by means of the arm 11a so as to transmit the set aperture value into the camera in the situation where the aperture value is set in the manual mode.

On the other hand, along with rotation of the lens barrel means at the time of mounting operation, the operation member 12 will be urged by means of the spring 15 in the clockwise direction toward one end of the arcuate slot 9a defined in the back member 9 so as to be engaged with a control member C2 located in the camera. This engagement will occur when the adapter member 8 is mounted in position on the camera.

The arm 14a of the diaphragm driving member 14 is engaged with the arm 12b of the operation member 12.

Thus, when the lens assembly is mounted on the camera, the members 11a and 12a will be brought into the engaged state with the control members C1 and C2 located within the camera.

As previously explained, the present invention relates to the support construction of the operation means or the signal transmission member in an interchangeable lens assembly which consists of adapter means supported at a predetermined position with reference to the camera and to lens barrel means which are rotatable relative to the camera and to the adapter means while the operation member and the signal transmission member of the lens assembly are maintained in a predetermined position during mounting of the lens assembly on the camera. By structuring the adapter means so as to rotatably hold the operation member and the aperture signal transmission member, the mounting part of the interchangeable lens assembly may be structured in a more compact form. That is, it will be adequate that the adapter means is arranged so as to be rotatable relative to the lens barrel means so that the size of the part along the axial direction may be decreased. That is, it is advantageous that the flange part 8b of the adapter member 8 should be arranged so as to be rotatable between the bayonet holding member 4 and the bayonet ring 6 so that the size taken in the direction of the optical axis may be decreased in order to realize a simpler construction of the lens barrel which contributes to the economical manufacture thereof.

The lens assembly of the invention is so structured that the operation member 12 and the signal transmission member 11 will be supported by the adapter means so that their engagement with the control members C1 and C2 of the camera may be easily and correctly established in accurate alignment therewith when the lens assembly is mounted on the camera. Furthermore, by providing the adapter means with the back member 9 having projections $9e_1$, $9e_2$ ... $9e_x$, the assembly of the operation member 12 will be greatly facilitated while movement along the direction of the optical axis may be prevented in an effective manner.

In the construction of the present invention, the back member 9 is complicated in shape and includes a cylindrical part 9c, the flange 9d, the holes 9a, 9b, the projections $9e_1$, $9e_2$ ... $9e_x$, $9f_1$, $9f_2$ ... $9f_x$, the feet $9h_1$, $9h_2$ ... $9h_x$, the projection 9i for positioning operation and other similar parts while it is further necessary that feet $9h_1$, $9h_2$, acting as coupling means should be elastically engaged in the circumferential groove 8c of the adapter member 8. Thus, it becomes possible to lower the manufacturing and assembly costs by forming the member 9 from plastic material.

Furthermore, in accordance with the present invention the signal transmission member 11 and the operation member 12 are supported by means of the back member 9 so that the shape of the adapter member 8 may be simplified which will also contribute to reducing the costs. Furthermore, because the members 11 and 12 are supported by means of the back member 9, assembly of the adapter means becomes easier and contributes to the overall economy of the device.

Figure 7:
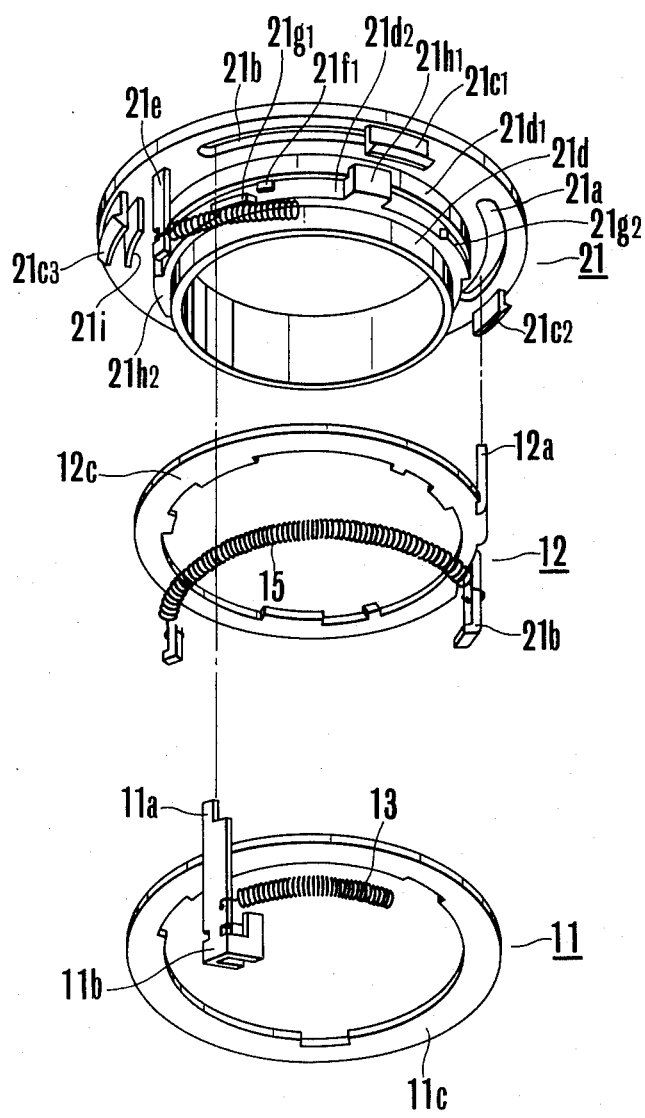
FIG. 7 is an exploded perspective view showing further important parts of the assembly of the invention.
Figure 8:
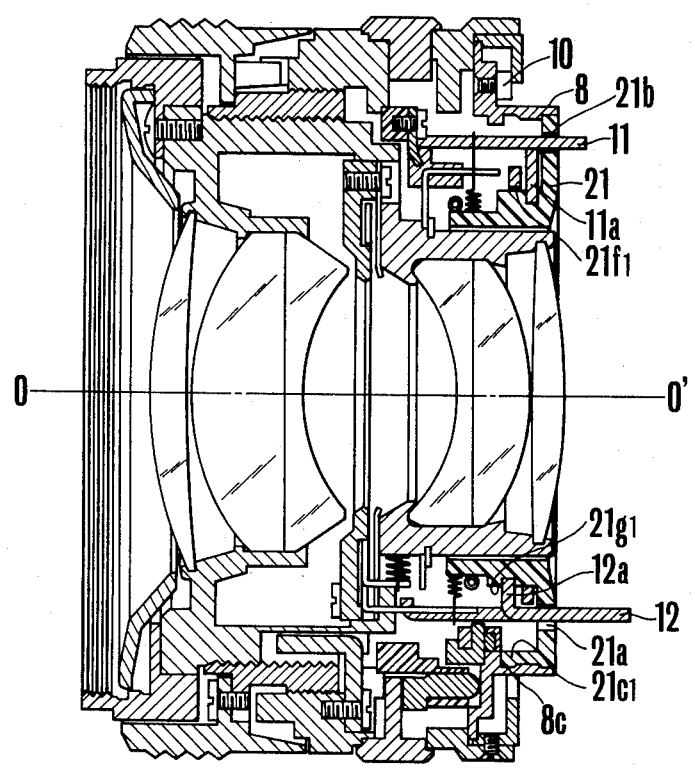
FIG. 8 is a sectional view of a lens assembly utilizing the parts shown in FIG. 7.

Another embodiment of the invention is shown in FIGS. 7 and 8 wherein the signal transmission member and the operation member are supported by the back adapter member.

As seen in FIG. 7, the embodiment of the invention depicted therein includes a back member 21 which has arcuate slots 21a and 21b through which the ends 12a and 11a of the operation member 12 and the signal transmission member 11 extend. Furthermore, the back member 21 has a plurality of feet $21c_1$, $21c_2$ ... $21c_x$ which engage the back member 21 in the adapter member 8. The annular part 11c of the signal transmission member 11 is engaged with a first part $21d_1$ (the part closest to the flange of the back member 21, as seen in the drawing) of the cylindrical part 21d of the back member 21, with the ring part 11c being urged in the counterclockwise direction by means of a spring 15 provided between a pin 21e and a lever 21b.

The annular part 12c of the operation member 12 is engaged with a plurality of projections $21f_1$, $21f_2$ ... $21f_x$ formed over the circumference of the shoulder $21d_2$ positioned below the circumference $21d_1$. The annular part 12c is urged in the clockwise direction by means of a spring 13 provided between pins (not shown) on the back member 21 and on the lever part 11b. Contact parts $21g_1$ and $21g_2$ are the contact parts for controlling the position of the operation member in the direction of the optical axis, whereby after the projections on the cylindrical part of the back member have been engaged in the notches $12c_1$, $12c_2$ ... $12c_x$ provided on the internal surface of the annular part 12c of the operation member 12 so as to engage the external diameter part of the projections $21f_1$, $21f_2$ ... $21f_x$ into the annular part, the position of the annular part 12c along the direction of the optical axis will be controlled by means of contact parts $21g_1$, $21g_2$ ... $21g_x$.

Projections $21h_1$, $21h_2$ ... $21h_x$ extend upwardly (as shown in the drawing) or toward the camera from the coaxial position with the contact parts $21g_1$, $21g_2$ ... $21g_x$ serving as second contact parts with an L-shaped profile. The annular part 11c of the signal transmission member 11 is internally held by means of the second contact parts $21h_1$, $21h_2$ ... $21h_x$ so as to control the position of the signal transmission member 11 in the direction of the optical axis. A projection 21i is provided on either side of the foot $21c_3$, being engageable in a notch (not shown) provided on the flange of the adapter member 8. After the feet $21c_1$, $21c_2$ ... $21c_x$ of the back member have been engaged in the groove 8c on the internal surface of the cylindrical part of the adapter member, the projection 21i will at the same time be engaged therein and the position of the back member 21 relative to the adapter member 8 will thus be controlled.

FIG. 8 is a sectional view taken through the principal parts of the embodiment of FIG. 7 along the axial direction.

In the case of this embodiment, after the signal transmission member 11 and the operation member 12 have been supported by the back member 21, the back member 21 will be engaged with the adapter member by utilization of the elastic feet $21c_1$, $21c_2$ ... $21c_x$ so as to constitute the adapter. In the case of the present embodiment, the signal transmission member 11 and the operation member 12 are not supported separately by means of the back member and the adapter member as in the case of the embodiment of FIGS. 1-3, but is supported by means of the back member so that the assembly work is simplified.

Here, the arm 11b of the signal transmission member in the embodiment shown in FIG. 7 is not grasped by means of the forked arm 18a of the preset cam ring shown in FIG. 1, but grasps the arm of the preset cam ring 18. That is, the end of the arm 11b is bent so as to grasp the arm of the cam ring 18.

Also, in the case of the present embodiment by making the back member from plastic material by utilizing molding techniques, the complicated configuration of the member may be precisely formed. The engagement in the ring groove 8c of the adapter member may be satisfactorily effected by utilizing the elasticity of the feet $21c_1, 21c_2 \ldots 21c_x$.

While specific embodiments of the invention have been shown and described in detail to illustrate the application of the inventive principles, it will be understood that the invention may be embodied otherwise without departing from such principles.

What is claimed is:

1. A support structure for the operation means of a diaphragm device of an interchangeable lens assembly for a camera including first component means held at a certain predetermined position with reference to said camera and second component means having lens operative components thereon and arranged so as to be rotatable relative to said first component means, comprising:
   (a) a first part included in said operation means for transmitting driving power from said camera to said diaphragm device and a ring part in which the operation means is rotatably engaged relative to said first component means;
   (b) said first component means being engaged in said ring part of said operation means and provided with a prevention part for preventing movement of said operation means along the direction of the optical axis of said lens assembly; and
   (c) projections included in said first component means in which the operation means is rotatably engaged for making contact with said ring part of said operation means.

2. A support structure according to claim 1 wherein said projections make point contact with said ring part.

3. A support structure according to claim 1 wherein said projections make line contact with said ring part.

4. A support structure for the operation means of a diaphragm device of an interchangeable lens assembly for a camera including first component means maintained at a certain predetermined position with reference to said camera and second component means rotatable relative to said first component means during a mounting operation comprising:
   (A) a first part included in said operation means for transmitting driving power from said camera to said diaphragm device and a ring part holding said operation means for rotation around the optical axis of said lens assembly;
   (B) said first component means supporting said operation means and including:
      (a) first means held at a predetermined position so as to be engageable with and disengageable from said second component means;
      (b) second means connected to said first means, said second means having coupling means to be coupled with complementary coupling means provided on said first means and holding means for holding said operation means rotatably around said optical axis, one of said coupling means and said complementary coupling means comprising elastic projections and the other comprising a recess in which said elastic projectons are engaged.

5. A support structure according to claim 4 wherein said second means includes a part for holding said ring part of said operation member which is cylindrical, the external surface of said cylindrical part having a shape for making contact with said operation means.

6. A support structure according to claim 5 wherein said cylindrical part makes point contact with said operation means.

7. A support structure according to claim 5 wherein said cylindrical part makes line contact with said operation means.

8. An interchangeable lens assembly for a camera including first component means held at a predetermined position with reference to said camera and second component means having lens operative components mounted thereon and arranged to be rotatable relative to said first component means comprising:
   (a) first means for supporting the operation member of a diaphragm device transmitting driving power from said camera to the diaphragm device and the signal transmitting member of said diaphragm device for transmitting exposure control signals between said lens assembly and said camera;
   (b) second means rotatably held on the internal surface of said second component means and elastically connected thereto by the elasticity of the material of said first means.

9. An interchangeable lens assembly for a camera comprising: lens barrel means having lens operative components thereon; adapter means having said lens barrel means rotatably connected therewith, said adapter means being adapted to be held stationary relative to said camera when said lens barrel means is rotated to couple and decouple said lens assembly and said camera; diaphragm means; aperture value setting means for establishing an aperture value for said diaphragm means; operation means for actuating said diaphragm means to effect a desired aperture in accordance with a set value on said aperture value setting means, said operation means including a first part for transmitting driving power from said camera to said diaphragm means and a ring part for rotatably engaging said operation means relative to said adapter means; said adapter means being engaged in said ring part of said operation means and including means for preventing movement of said operation means in a direction along the optical axis of said interchangeable lens assembly.

10. A support structure for an exposure signal transmitting member of a diaphragm device of an interchangeable lens assembly for a camera including first component means held at a certain predetermined position with reference to said camera and second component means having lens operative components thereon and arranged so as to be rotatable relative to said first component means, comprising:
   (a) a lever part included in said exposure signal transmitting member for transmitting an exposure signal between said lens assembly and the camera and a ring part in which the exposure signal transmitting member is rotatably engaged relative to said first component means;
   (b) said first component means having holding means to rotatably hold said ring part of said exposure signal transmitting member and for preventing movement of said exposure signal transmitting member along the direction of the optical axis of said lens assembly.

11. A support structure according to claim 10 wherein said first component means include a first member and a second member, (a) said first member comprising a cylindrical part and a flange part and coupling means for coupling with a complementary coupling means of said second member, with said ring part of said exposure signal transmitting member being rotatably disposed on the external circumference of said cylindrical part;

(b) said second member comprising a cylindrical part and a flange part, said flange part of said second member forming said holding means for said exposure signal transmitting member.

12. A support structure for the operation means of a light defining means of an interchangeable lens assembly for a camera including first component means held at a certain predetermined position with reference to said camera and second component means having lens operative components thereon and arranged so as to be rotatable relative to said first component means, comprising:

(a) a driving power transmitting member having a transmitting member to transmit driving power from said camera to said light defining means and a ring part;

(b) an exposure signal transmitting means for transmitting an exposure signal between said lens assembly and said camera including a transmitting member to transmit control signals between said light defining means and an exposure control mechanism of said camera, and a ring part for rotatably holding said exposure signal transmitting means within said lens assembly;

(c) said first component means including a first member and a second member, said first member having coupling means for coupling with complementary coupling means of said second member, and said first member having holding means to rotatably hold said driving power transmitting member, said second member having holding means to rotatably hold said exposure signal transmitting means.

13. A support structure according to claim 12 wherein said first and second members include a cylindrical part and a flange part, said holding means of said first member for said driving power transmitting member being formed on said cylindrical part of said first member, and said holding means of said second member for said exposure signal transmitting means being formed on said flange part of said second member.

14. A support structure for a driving power transmitting means and an exposure signal transmitting means of an interchangeable lens assembly for a camera comprising first component means maintained at a certain predetermined position with reference to said camera and second component means rotatable relative to said first component means;

(a) said first component means comprising a first member and a second member, said first and said second member having a cylindrical part and a flange part, said first member having coupling means for coupling with complementary coupling means of said second member, said cylindrical parts of said first and second member forming a space, said space having holding means of said driving power transmitting means, said flange part of said first member having a slot;

(b) said driving power transmitting means having a connecting lever to connect with the camera side and a ring part, said ring part of said driving power transmitting means being disposed rotatably within said space and said connecting lever extending from said slot of said flange part of said first member;

(c) said flange part of said second member having holding means to rotatably hold said exposure signal transmitting means, and an end portion of said exposure signal transmitting means extending from said slot of said flange part of said first member to said camera.

* * * * *